US007716000B2

(12) United States Patent
Nagao et al.

(10) Patent No.: US 7,716,000 B2
(45) Date of Patent: May 11, 2010

(54) SENSOR APPARATUS HAVING SENSOR ELEMENT

(75) Inventors: Kazuyuki Nagao, Kanagawa-ken (JP); Shuji Hayashi, Kanagawa-ken (JP); Ichiro Kato, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/197,443

(22) Filed: Aug. 25, 2008

(65) Prior Publication Data

US 2009/0058516 A1 Mar. 5, 2009

(30) Foreign Application Priority Data

Aug. 28, 2007 (JP) ............................. 2007-221547
Aug. 28, 2007 (JP) ............................. 2007-221548

(51) Int. Cl.
*G06F 19/00* (2006.01)
(52) U.S. Cl. ..................... 702/104; 73/629; 73/649; 327/4; 700/90; 702/174; 702/189
(58) Field of Classification Search ................. 702/104, 702/174, 189; 327/4; 700/90; 73/629, 649
See application file for complete search history.

(56) References Cited

U.S. PATENT DOCUMENTS

| | | |
|---|---|---|
| 5,764,547 A | 6/1998 | Bilich et al. |
| 6,032,109 A * | 2/2000 | Ritmiller, III ............... 702/104 |
| 6,571,132 B1 * | 5/2003 | Davis et al. ................... 700/2 |
| 7,124,632 B2 * | 10/2006 | Smith ..................... 73/504.02 |

FOREIGN PATENT DOCUMENTS

JP 04313020 11/1992

(Continued)

OTHER PUBLICATIONS

Qian et al., 'Computational Approach for Optimal Sensor Setup', May 2003, General Electric Publication, Optical Engineering, vol. 42, No. 5, pp. 1238-1248.*

(Continued)

*Primary Examiner*—Eliseo Ramos Feliciano
*Assistant Examiner*—Elias Desta
(74) *Attorney, Agent, or Firm*—Turocy & Watson, LLP

(57) ABSTRACT

A sensor apparatus is disclosed. A sense circuit is provided to convert inputted physical quantity to electrical signal. An amplifier amplifies an analog signal outputted from the sense circuit. An A/D converter converts the output signal of the amplifier to digital data. A sensing interval setup unit sets a sensing interval for the sense circuit. A power supply unit supplies electric power to the sense circuit, the amplifier and the A/D converter. The amplifier and the A/D converter constitute an analog signal processing unit. A power supply control unit is provided to control the power supply unit. A storage unit stores the digital data outputted from the A/D converter every sensing interval of the sensing interval. A data value change judgment unit changes the setup of the sensing interval by the sensing interval setup unit. The data value change judgment unit also changes the control mode of the power supply control unit in response to judgment of value change between a plural number of digital data which are designated from the digital data being stored in the storage unit.

10 Claims, 13 Drawing Sheets

FOREIGN PATENT DOCUMENTS

| | | |
|---|---|---|
| JP | 08178781 | 7/1996 |
| JP | 09026347 | 1/1997 |
| JP | 11094636 | 4/1999 |
| JP | 2000-298057 | 10/2000 |
| JP | 2003182328 | 7/2003 |

OTHER PUBLICATIONS

Japanese Office Action dated Nov. 13, 2009 corresponding to U.S. Appl. No. 12/197,443 filed on Aug. 25, 2008.

Japanese Office Action dated Jan. 22, 2010 corresponding to U.S. Appl. No. 12/197,443 filed on Aug. 25, 2008.

\* cited by examiner

SENSOR APPARATUS HAVING SENSOR ELEMENT

CROSS REFERENCE TO RELATED APPLICATION

The application is based upon and claims the benefit of priority from the prior Japanese Patent Applications No. 2007-221548 and No. 2007-221547 respectively filed on Aug. 28 2007, the entire contents of which are incorporated herein by reference.

FIELD OF THE INVENTION

The invention relates to a sensor apparatus which is provided with a sensor circuit having a sensor element.

DESCRIPTION OF THE BACKGROUND

A resistance change type sensor apparatus is known as a sensor apparatus. The resistance change type sensor apparatus is provided with a sensor circuit having a resistance element as a sensor element. The sensor circuit detects change of physical quantity of an object to be measured as change of resistance.

For example, in a diaphragm type pressure sensing apparatus, a semiconductor distortion gauge having a semiconductor element is formed on a surface of a diaphragm. The diaphragm is deformed by a force or a pressure from the outside. The resistance of the semiconductor element changes by piezo-resistance effect which arises when the diaphragm is deformed. The change of the resistance of the semiconductor element is converted to an electrical signal and is outputted.

In such a resistance change type sensor apparatus, current is consumed in the resistance element constantly, since it is necessary to apply current/voltage to the resistance element always.

Further, current being consumed in an amplifier is added to the consumption current, because the electrical signal outputted from the resistance element is very small and needs to be amplified by the amplifier.

Such a resistance change type sensor apparatus is used, in many cases, in a small portable apparatus or an apparatus to be driven by a battery so that the above described current consumptions are not preferable, and thus reduction of power consumption is strongly required for the resistance change type sensor apparatus.

A resistance change type pressure gauge is shown as a sensor apparatus in the Japanese patent publication (Kokai) No. 2003-329531, Pages 6 to 7 and FIG. 6. The operation mode of the resistance change type pressure gauge is changed from a normal mode to a sleep mode automatically, and a power supply is turned off, when operation is not executed during a predetermined time period under use of the pressure gauge.

In the pressure gauge, the operation mode is changed to a sleep mode only when operation signal from the outside is not inputted during a predetermined time period. The change of the operation mode is determined by not being operated by an external signal, and the state of the inside of the pressure gauge is not necessarily reflected.

The pressure gauge continues operation of an ordinary mode, even when the physical quantity of an object to be measured is stable and output of a sense circuit does not change. Thus, power consumption of the pressure gauge is not reduced.

On the other hand, variation of offset or sensitivity exists among sensor apparatuses to detect physical quantity of an object to be measured. In the sensor apparatuses, drift of offset or sensitivity occurs depending on temperature.

The Japanese patent publication (Kokai) No. 2005-37301, Pages 6-7 and FIG. 1 discloses a sensor apparatus which incorporate an adjustment circuit for adjusting sensor output signal. An adjustment circuit adjusts the variation of offset or sensitivity existing among sensor apparatuses.

The sensor apparatus is provided with a temperature sensor and a memory. The memory stores a fixed offset value, a fixed gain adjustment value, an offset to temperature coefficient and a gain to temperature coefficient respectively as adjustment values for each of sensor circuits.

The adjustment circuit adjusts offset and gain of an amplifier which amplifies the sensor output signal by reading the offset value and the gain adjustment value from the memory. The adjustment circuit adjusts the drift being caused by temperature change based on the detection value of the temperature sensor.

However, the sensor apparatus needs a memory to store various adjustment values, an adjustment circuit and, further, a temperature sensor to observe temperature. Therefore, the amount of hardware of the sensor apparatus is large.

The fixed offset value and the fixed gain adjustment value are initial values at the time of sensor shipment. Thus, it is difficult to correctly adjust characteristic change of a sensor element provided in the sensor apparatus which is caused by aging.

SUMMARY OF THE INVENTION

An aspect of the present invention provides a sensor apparatus including a sense circuit to convert inputted physical quantity to electrical signal, an analog signal processing unit having an amplifier and a A/D converter, the amplifier amplifying an analog signal outputted from the sense circuit, and the A/D converter converting the output signal of the amplifier to a digital data, a sensing interval setup unit to set a sensing interval for the sense circuit, a power supply unit to supply electric power to the sense circuit and the analog signal processing unit, a power supply control unit to control the power supply unit, a storage unit to store the digital data outputted from the A/D converter every sensing interval of the sensing interval, and a data value change judgment unit to change the setup of the sensing interval by the sensing interval setup unit, the data value change judgment unit changing the control mode of the power supply control unit in response to judgment of value change between a plural number of digital data designated from the digital data being stored in the storage unit.

Another aspect of the invention provides a sensor apparatus including a sense circuit to convert inputted physical quantity to electrical signal, an analog signal processing unit having an amplification circuit and an A/D converter, the amplification circuit amplifying an analog signal outputted from the sense circuit, and the A/D converter converting the output signal of the amplifier to digital data, a sensing interval setup unit to set a sensing interval for the sense circuit, a power supply unit to supply electric power to the sense circuit and the analog signal processing unit, a power supply control unit to control the power supply unit, a storage unit to store the digital data outputted from the A/D converter every sensing interval of the sensing interval, a data value change judgment unit to change the setup of the sensing interval by the sensing interval setup unit, the data value change judgment unit changing the control mode of the power supply control unit in response to judgment of value change between a plural number of digital data designated from the digital data being stored in the storage unit, an offset adjustment unit to adjust the offset voltage of the amplification circuit, a sensitivity adjustment unit to adjust the amplification degree of the amplification circuit, a program memory to store an adjustment program to adjust the offset voltage and the sensitivity of the amplification circuit, and an adjustment processing unit to control the offset adjustment unit and the sensitivity adjustment unit based on the adjustment program stored in the program memory.

Further another aspect of the invention provides a sensor apparatus including: sense circuits to convert inputted physical quantities to electrical signal, a selector to select analog signals being outputted from the sense circuits, an analog signal processing unit having an amplification circuit and an A/D converter, the amplification circuit amplifying an analog signal outputted from each of the sense circuits selected by the selector, and the A/D converter converting the output signal of the amplification circuit to digital data, a sensing interval setup unit to set a sensing interval for the sense circuits, a power supply unit to supply electric power to the sense circuits and the analog signal processing unit, a power supply control unit to control the power supply unit, a storage unit to store the digital data outputted from the A/D converter every sensing interval of the sensing interval, a data value change judgment unit to change the setup of the sensing interval by the sensing interval setup unit, the data value change judgment unit changing the control mode of the power supply control unit in response to judgment of value change between a plural number of digital data designated from the digital data being stored in the storage unit, an offset adjustment unit to adjust the offset voltage of the amplification circuit, a sensitivity adjustment unit to adjust the amplification degree of the amplification circuit, a program memory to store an adjustment program to adjust the offset voltage and the sensitivity of the amplification circuit, and an adjustment processing unit to process adjusting set voltage and sensitivity of the amplification circuit for each of the sense circuits based on the adjustment program stored in the program memory.

DETAILED DESCRIPTION OF THE INVENTION

Embodiments of the present invention will be described hereinafter with reference to the accompanying drawings.

Figure 1:
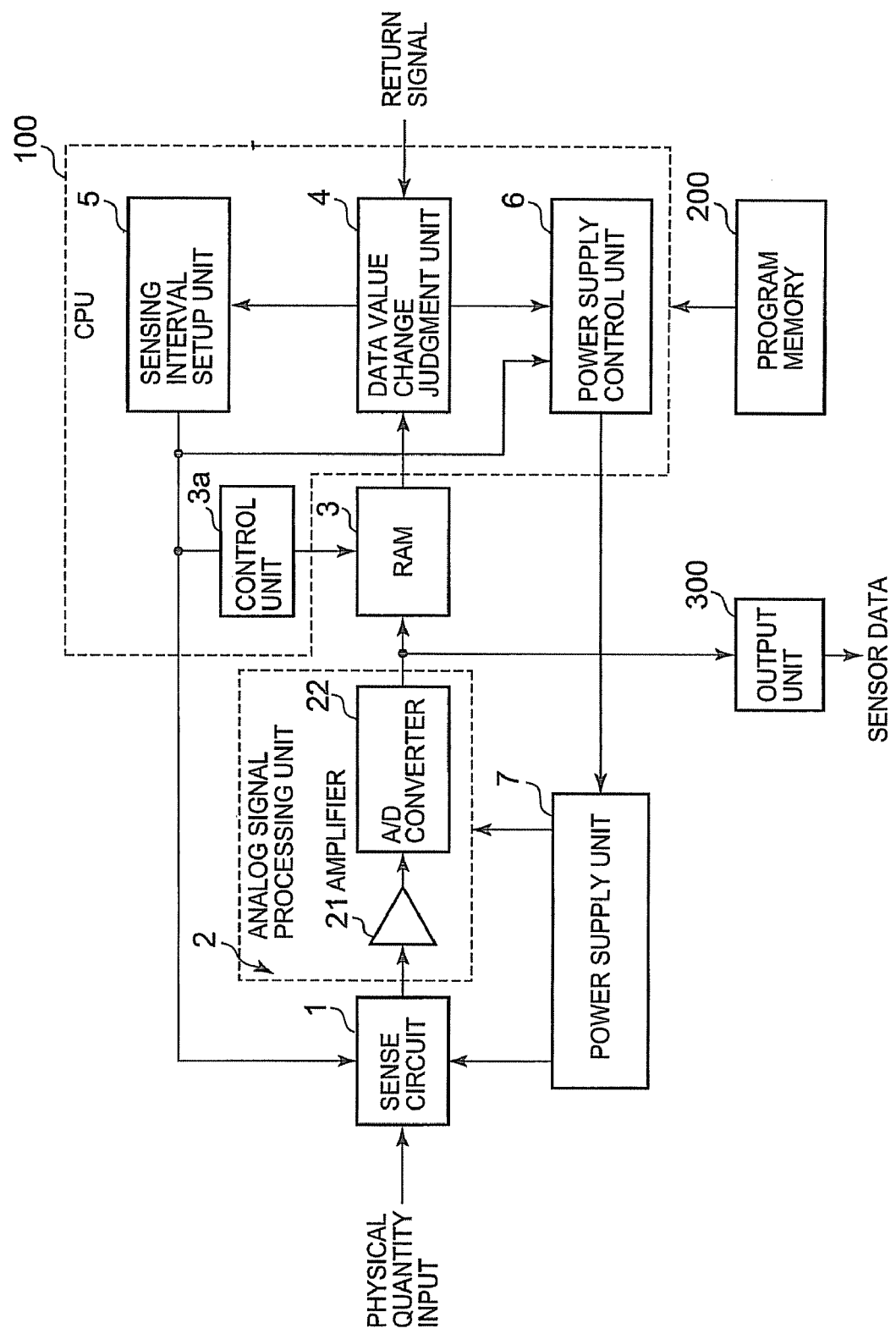
FIG. 1 is a block diagram showing a configuration of a sensor apparatus according to a first embodiment of the invention.

A first embodiment of the invention will be described with reference to FIGS. 1 to 5. FIG. 1 is a block diagram showing a configuration of a sensor apparatus according to the first embodiment.

As shown in FIG. 1, the sensor apparatus is provided with a sense circuit 1 as a sense unit. The sense circuit 1 converts inputted physical quantity to voltage. The sense circuit 1 is a resistance change type sensor having a sense element to detect physical quantity such as pressure, acceleration or humidity. The sense circuit 1 performs sensing of inputted physical quantity every set-up sensing interval.

A very small amount of analog signal outputted from the sense circuit 1 is amplified by the amplifier 21. The output signal of the amplifier 21 is converted to a digital signal by an A/D converter 22. The amplifier 21 and the A/D converter 22 constitute an analog signal processing unit 2.

The sense apparatus has a central processing unit (CPU) 100. The CPU 100 has a section which is provided with a data value change judgment unit 4, a sensing interval setup unit 5, a power supply control unit 6 and a control unit 3a. The section is used for sensing interval setup and power control.

The sensing interval setup unit 5 of CPU100 sends a sensing interval control signal to the sense circuit 1 in order to set a sensing interval of the sense circuit 1. The sensing interval setup unit 5 also sends a reading/writing control signal to a random access memory (RAM) 3 as a storage unit via the control unit 3a.

The digital data outputted from the A/D converter 22 is written in the RAM 3, by the control unit 3a every sensing interval of the sensing interval mentioned above.

The control unit 3a controls the RAM 3 to output a predetermined plural number of data designated from the digital data sequently from a newly stored data to a previously stored data. The outputted data (read data) is sent to the data value change judgment unit 4 of CPU100. The data value change judgment unit 4 judges whether change among the data values of the read digital data exists or not.

The sensing interval setup unit 5 changes sensing interval of the sense circuit 1 in response to judgment of the data value change judgment unit 4. The power supply control unit 6 changes the power supply mode according to the judgment result of the data value change judgment unit 4 and the output of the sensing interval setup unit 5.

Based on a program stored in a program memory 200, the section of the CPU100 carries out processing by the data value change judgment unit 4, the sensing interval setup unit 5, the power supply control unit 6 and the control unit 3a.

The output of the A/D converter 22 is outputted as sensor data in a predetermined output form by an output unit 300.

The sense circuit 1 of the embodiment performs sensing of inputted physical quantity every sensing interval of the sensing interval set up by the sensing interval setup unit 5. Therefore, in the sense circuit 1, a waiting state arises during sensing interval until the sense circuit 1 performs the next sense operation.

The sensing interval setup unit 5 sets up sensing interval TO as an initial value of the sensing interval. In the embodiment, the state, where the initial value is set as the sensing interval, is called "an ordinary operation mode."

When "no change" is indicated by the judgment of the data value change judgment unit 4, it shows no change in physical quantity inputted into the sense circuit 1. In such a case, it is not necessary to perform sensing by the sense circuit 1 frequently.

When "no change" is indicated by the judgment of the data value change judgment unit 4, the sensing interval setup unit 5 changes the sensing interval so that the sensing interval may become longer than the initial value T0.

In the embodiment, change of the sensing interval is carried out gradually. When, in the beginning, the sensing interval is the initial value and "no change" is indicated by the judgment of the data value change judgment unit 4, the sensing interval is changed to T1 (T1>T0). Further, even after change of the sensing interval, when "no change" continues to be indicated by the judgment of the data value change judgment unit 4, the sensing interval is changed to T2 (T2>T1).

Here, the state, where the sensing interval is Ti, is called "an intermittent operation mode". The state, where the sensing interval is T2, is called "a standby operation mode".

The power supply control unit 6 sends a stop signal to a power supply unit 7. As a result, the power supply unit 7 is stopped to supply power to the sense circuit 1 and the analog signal processing unit 2, when "no change" is still indicated by the judgment of the data value change judgment unit 4, even after the sensing interval is changed to the standby operation mode.

The power supply unit 7 stops the power supply to the sense circuit 1 and the analog signal processing unit 2 in response to the stop control. As a result, the sense circuit 1 and the analog signal processing unit 2 become in a stop state. The state is called "a stop operation mode".

Thus, in the embodiment, when "no change" continues to be indicated in the judgment of the data value change judgment unit 4, the operation mode shifts from the ordinary operation mode, via the intermittent operation mode and the standby operation mode to the stop operation mode.

As the operation mode shifts from the ordinary operation mode via the intermittent operation mode to the standby operation mode, the sensing interval becomes longer so that power consumption by sensing operation decreases.

In the stop operation mode, loss of power consumption can be avoided in the sense circuit 1 and the analog signal processing unit 2 It is because electric power is stopped supplying to the sense circuit 1 and the analog signal processing unit 2.

Electric power may be stopped supplying to one of the sense circuit 1 or the analog signal processing unit 2.

When the data value change judgment unit 4 shows "change" in the intermittent operation mode and the standby operation mode", the sensing interval setup unit 5 returns the sensing interval to the initial value T0 so that the operation mode goes back to the ordinary mode.

In the stop operation mode, the power supply control unit 6 sends a control signal to make the power supply unit 7 restart to supply electric power to the sense circuit 1 and the analog signal processing unit 2, by inputting a return signal from the outside. At the time, the sensing interval setup unit 5 returns the sensing interval to the initial value T0 so that the operation mode goes back to the ordinary mode.

Figure 2:
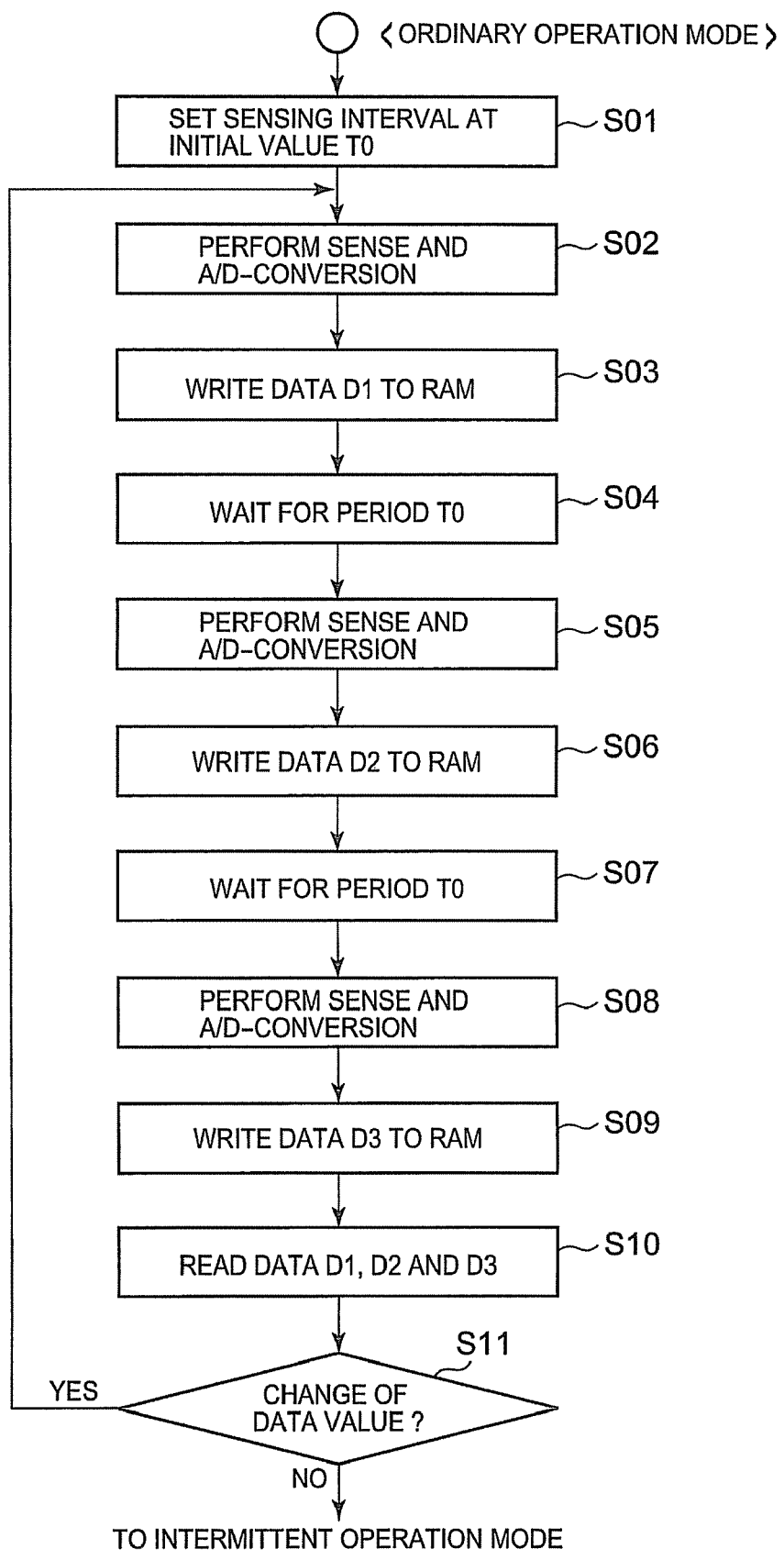
FIGS. 2 to 5 are flow charts for explaining operation of the sensor apparatus of the first embodiment.
Figure 3:
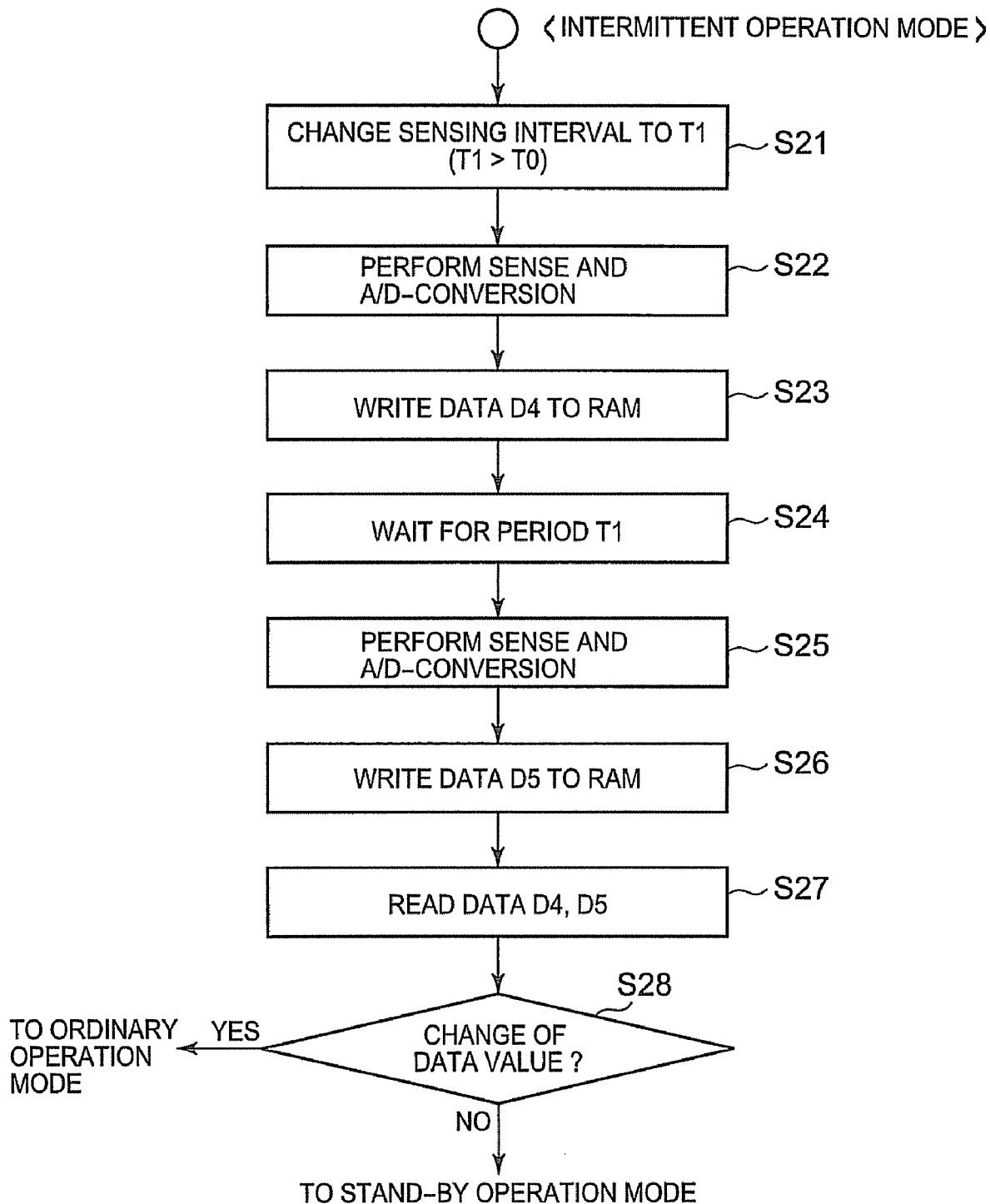
Figure 4:
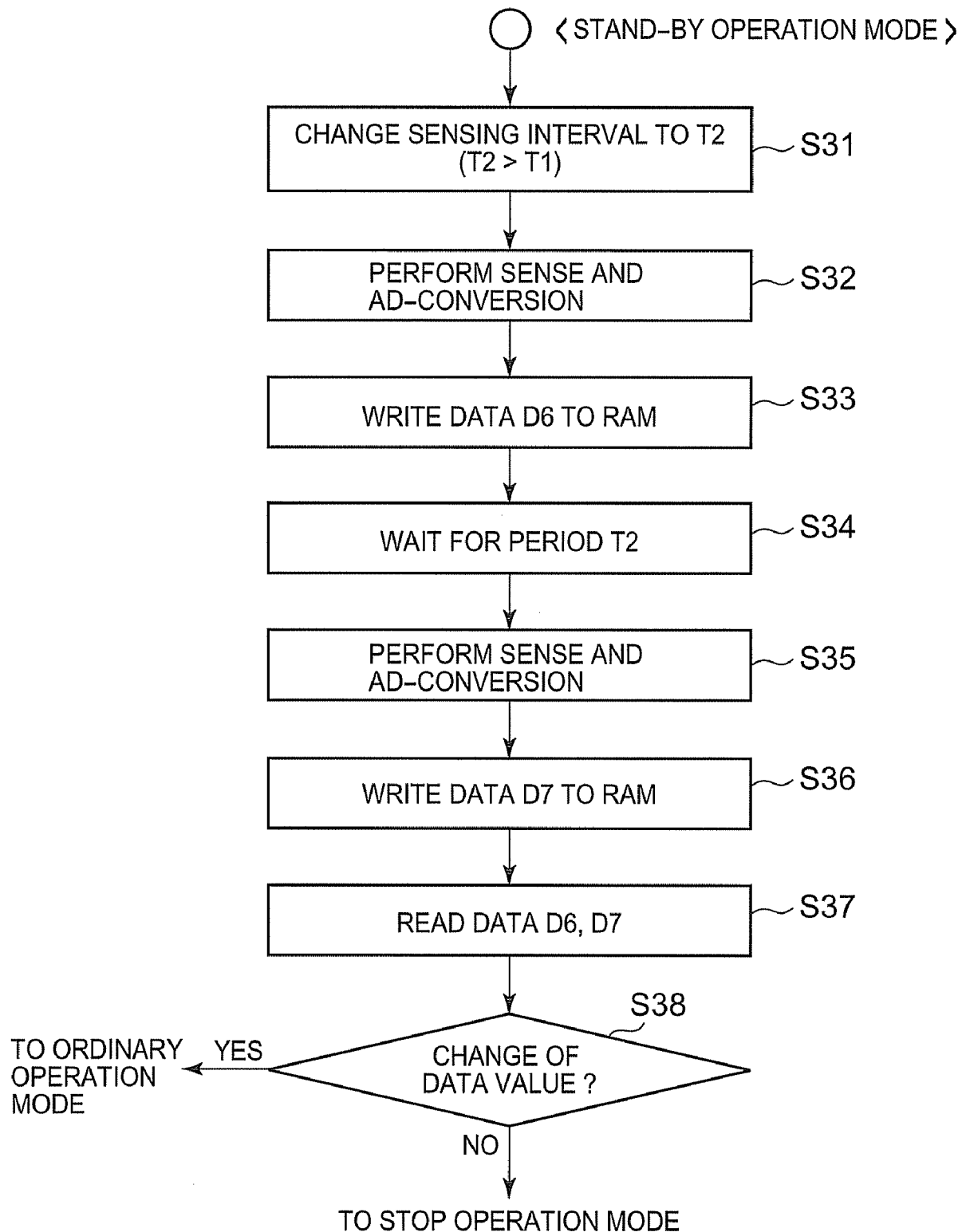
Figure 5:
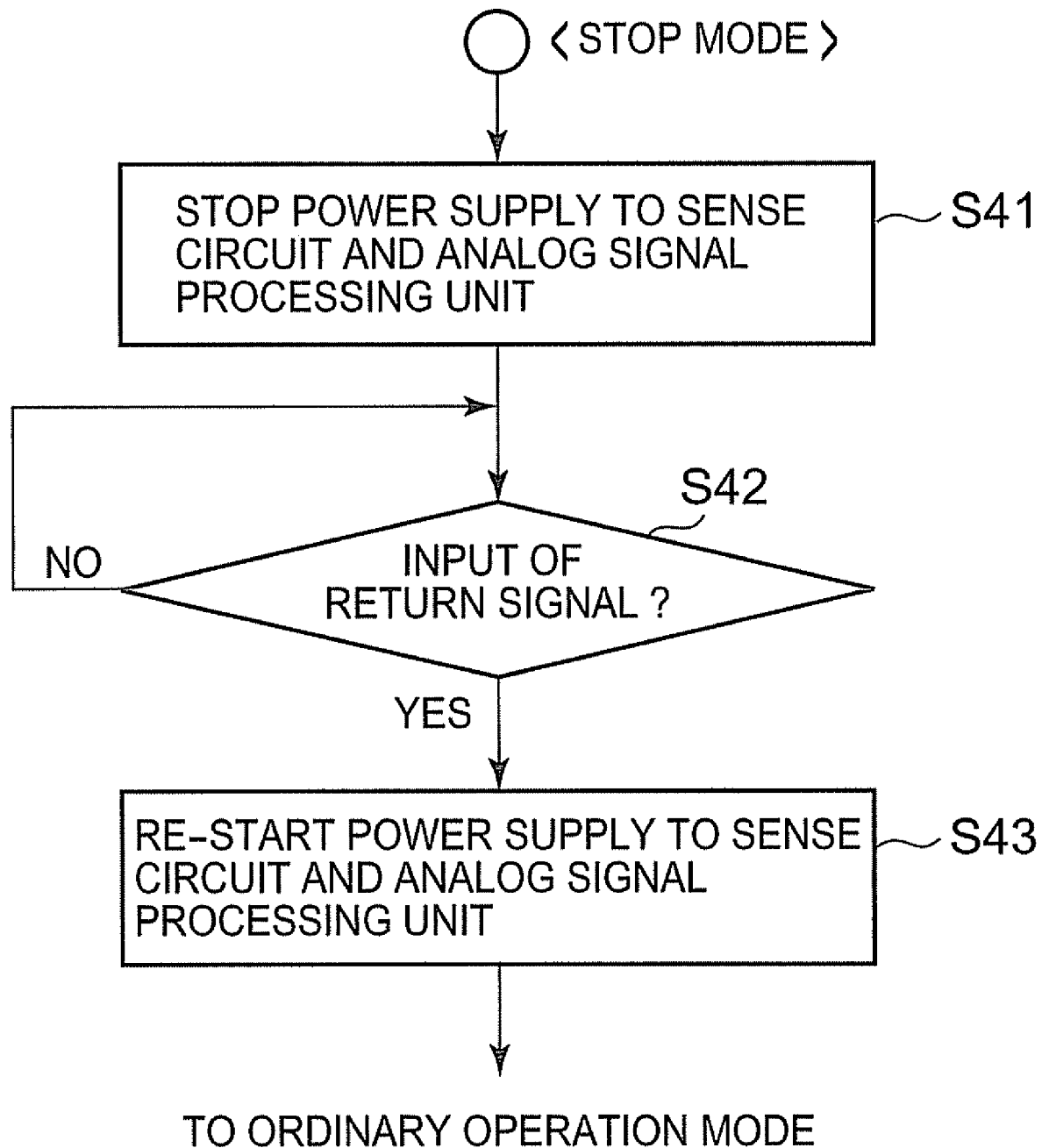

FIGS. 2 to 5 show flows of processing in each of the operation modes. FIG. 2 shows a flow of processing in the ordinary operation mode. FIG. 3 shows a flow of processing in the intermittent operation mode. FIG. 4 shows a flow of processing in the standby operation mode. FIG. 5 shows a flow of processing in the stop operation mode.

Here, the number of the data read from the RAM 3 is predetermined to be three for the ordinary operation mode and two for the intermittent operation mode and the standby operation mode.

The processing flow of the ordinary operation mode will be explained with reference to FIG. 2.

In the ordinary mode, the sensing interval setup unit 5 sets the sensing interval to the initial value T0 (Step S01).

In the state, a first time sensing is carried out by the sense circuit 1, and the A/D conversion is performed by the analog signal processing unit 2 (Step S02). A digital data D1 obtained as a result of the A/D conversion by the A/D converter 22 is written in the RAM 3 (Step S03).

Then, a waiting set by the sensing interval setup unit 5 is carried out for the period of T0 (Step S04). After ending of the waiting, a second time sensing is performed. As a result, a sensing is carried out by the sense circuit 1, and the A/D conversion is performed by the analog signal processing unit 2 (Step S05). A digital data D2 obtained as a result of the A/D conversion by the A/D converter 22 is written in the RAM 3 (Step S06).

Then, a waiting set by the sensing interval setup unit 5 is carried out for the period of T0 (Step S07). After ending of the waiting, a third time sensing is performed. As a result, a sensing is carried out by the sense circuit 1, and the A/D conversion is performed by the analog signal processing unit 2 (Step S08). A digital data D3 obtained as a result of the A/D conversion by the A/D converter 22 is written in the RAM 3 (Step S09).

Since the three data D1, D2 and D3 have been written in the RAM 3 as the predetermined plural number of data, the three data are read from the RAM3 and are sent to the data value change judgment unit 4 sequently from a newly stored data (Step S10). The data value change judgment unit 4 performs judgment whether change of data value exists or not among the three data (Step S11).

When the data value change judgment unit 4 judges as "change (Y)", the flow returns to Step S02 so that the same steps as described above are repeated.

On the other hand, when the data value change judgment unit 4 judges as "no change (N)", the flow go to the intermittent operation mode.

The processing flow of the intermittent operation mode will be explained with reference to FIG. 3.

When the judgment of data value change judgment unit 4 is "no change" in the ordinary operation mode, the sensing interval setup unit 5 changes the sensing interval to T1 (T1>T0) (Step S21).

In the state, a first time sensing is carried out by the sense circuit 1, and the A/D conversion is performed by the analog signal processing unit 2 (Step S22). A digital data D4 obtained as a result of the A/D conversion by the A/D converter 22 is written in the RAM 3 (Step S23).

Then, a waiting set by the sensing interval setup unit 5 is carried out for the period of T1 (Step S24). After ending of the waiting, a second time sensing is performed. As a result, a sensing is carried out by the sense circuit 1, and the A/D conversion is performed by the analog signal processing unit 2 (Step S25). A digital data D5 obtained as a result of the A/D conversion by the A/D converter 22 is written in the RAM 3 (Step S26).

Since the two data D4 and D5 have been written in the RAM 3 as the predetermined plural number of data, the two data are read from the RAM3 and are sent to the data value change judgment unit 4 sequently from a newly stored data (Step S27). The data value change judgment unit 4 performs judgment whether change of data value exists or not between the two data (Step S28).

When the data value change judgment unit 4 judges as "change (Y)", the flow go to the ordinary operation mode, and the flow of FIG. 2 is carried.

On the other hand, when the data value change judgment unit 4 judges as "no change (N)", the flow go to the standby operation mode.

The processing flow of the standby operation mode will be explained with reference to FIG. 4.

When the judgment of data value change judgment unit 4 is "no change" in the intermittent operation mode, the sensing interval setup unit 5 changes the sensing interval to T2 (T2>T1) (Step S31).

In the state, a first time sensing is carried out by the sense circuit 1, and the A/D conversion is performed by the analog signal processing unit 2 (Step S32). A digital data D6 obtained as a result of the A/D conversion by the A/D converter 22 is written in the RAM 3 (Step S33).

Then, a waiting set by the sensing interval setup unit 5 is carried out for the period of T2 (Step S34). After ending of the waiting, a second time sensing is performed. As a result, a sensing is carried out by the sense circuit 1, and the A/D conversion is performed by the analog signal processing unit 2 (Step S35). A digital data D7 obtained as a result of the A/D conversion by the A/D converter 22 is written in the RAM 3 (Step S36).

Since the two data D6 and D7 have been written in the RAM 3 as the predetermined plural number of data, the two data are read from the RAM3 and are sent to the data value change judgment unit 4 sequently from a newly stored data (Step S37). The data value change judgment unit 4 performs judgment whether change of data value exists or not between the two data (Step S38).

When the data value change judgment unit 4 judges as "change (Y)", the flow go to the ordinary operation mode, and the flow of FIG. 2 is carried.

On the other hand, when the data value change judgment unit 4 judges as "no change (N)", the flow go to the stop operation mode.

The processing flow of the stop operation mode will be explained with reference to FIG. 5.

The power supply control unit 6 controls the power supply unit 7 to stop power supply to the sense circuit 1 and the analog signal processing unit 2, when "no change" is indicated by the judgment of the data value change judgment unit 4 in the standby operation mode (Step S41).

Then, the CPU 100 observes whether a return signal is inputted from the outside (Step S42). When "no input of the return signal (N)" is recognized, the power supply unit 7 continues stopping power supply to the sense circuit 1 and the analog signal processing unit 2.

On the other hand, input of the return signal from the outside is recognized, the power supply control unit 6 controls the power supply unit 7 to restart to supply electric power to the sense circuit 1 and the analog signal processing unit 2. The operation mode goes back to the ordinary mode (Step S43).

In the embodiment, when "no change" is indicated in the data sensed by the sense circuit, the sensor apparatus itself judges that frequent detection of physical quantity is unnecessary, and the sensor apparatus changes the operation mode automatically so as to lengthen the sensing interval gradually. As a result, unnecessary sensing operation can be reduced, and power consumption may be reduced.

Since the power supply to the sense circuit 1 and the analog signal processing unit 2 is stopped at the time of the stop operation mode, loss of power consumption is suppressed.

Figure 6:
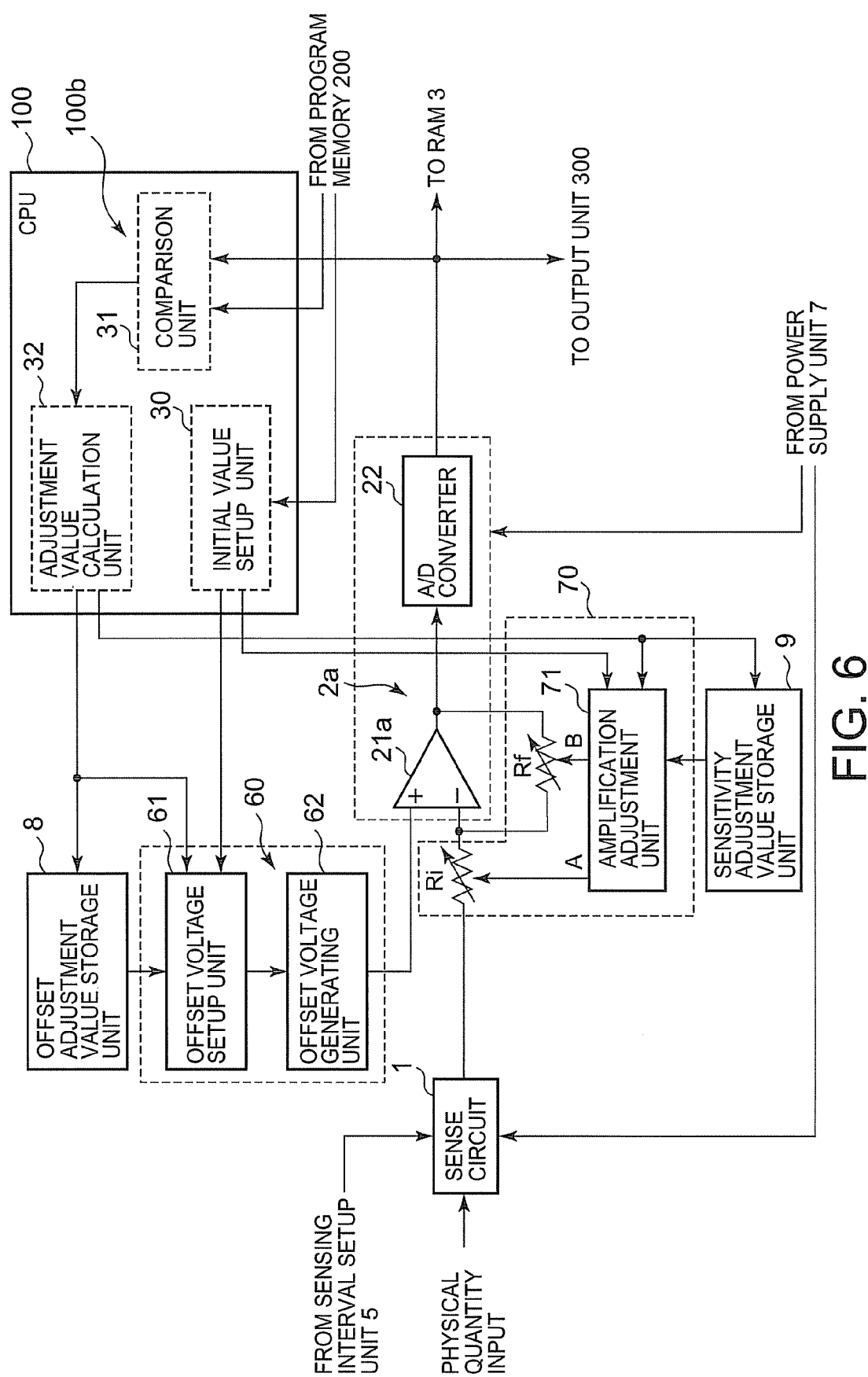
FIG. 6 is a block diagram showing a configuration of a sensor apparatus according to a second embodiment of the invention.

FIG. 6 is a block diagram showing a configuration of a sensor apparatus according to a second embodiment of the invention.

The embodiment adds adjustment functions to be described below to the sensor apparatus shown in FIG. 1. The same numerals are designated for the same portions of FIG. 1 respectively.

An output of the sensor circuit 1 is inputted into an analog signal processing unit 2a. The analog signal processing unit 2a is provided with an A/D converter 22 and an amplification circuit 21a such as an operational amplifier. Digital data is stored in the RAM 3 as an output of the A/D converter 22.

In the sensor apparatus of the embodiment, a adjustment program is stored in the program memory 200 to execute the CPU 100. Further, the sensor apparatus is provided with an offset adjustment unit 60 and a sensitivity adjustment unit 70.

The offset adjustment unit 60 adjusts an offset voltage to be provided to the amplification circuit 21a by an instruction which is sent from an adjustment processing section 100b of the CPU 100. The sensitivity adjustment unit 70 adjusts the amplification of the amplification circuit 21a by an instruction from the CPU100.

The sensor apparatus is provided with an offset adjustment value storage unit 8 and a sensitivity adjustment value storage unit 9. The offset adjustment value storage unit 8 stores an offset adjustment value acquired as a result of adjustment processing of the CPU 100. The sensitivity adjustment value storage unit 9 stores a sensitivity adjustment value.

The output of the sensor circuit 1 is inputted into a minus (−) terminal (a reversal input terminal) of the amplification circuit 21a via a variable resistor Ri of the sensitivity adjustment unit 70. The offset voltage outputted from the offset adjustment unit 60 is inputted into a plus (+) terminal of the amplification circuit 21a. The output of amplification circuit 21a is fed back to the minus (−) terminal via a variable resistor Rf of the sensitivity adjustment unit 70.

The amplification circuit 21a operates as a reversal amplifier to amplify the voltage difference between the minus (−) terminal and the plus (+) terminal by amplification degree Rf/Ri.

The amplification degree of the amplification circuit 21a may be changed by changing the resistances of the variable resistors Ri and Rf.

The offset adjustment unit 60 has an offset voltage setup unit 61 and an offset voltage generating unit 62. The offset voltage setup unit 61 sets up the value of the offset voltage according to an instruction from the CPU 100. The offset voltage generating unit 62 generates the offset voltage set up by the offset voltage setup unit 61.

Figure 7:
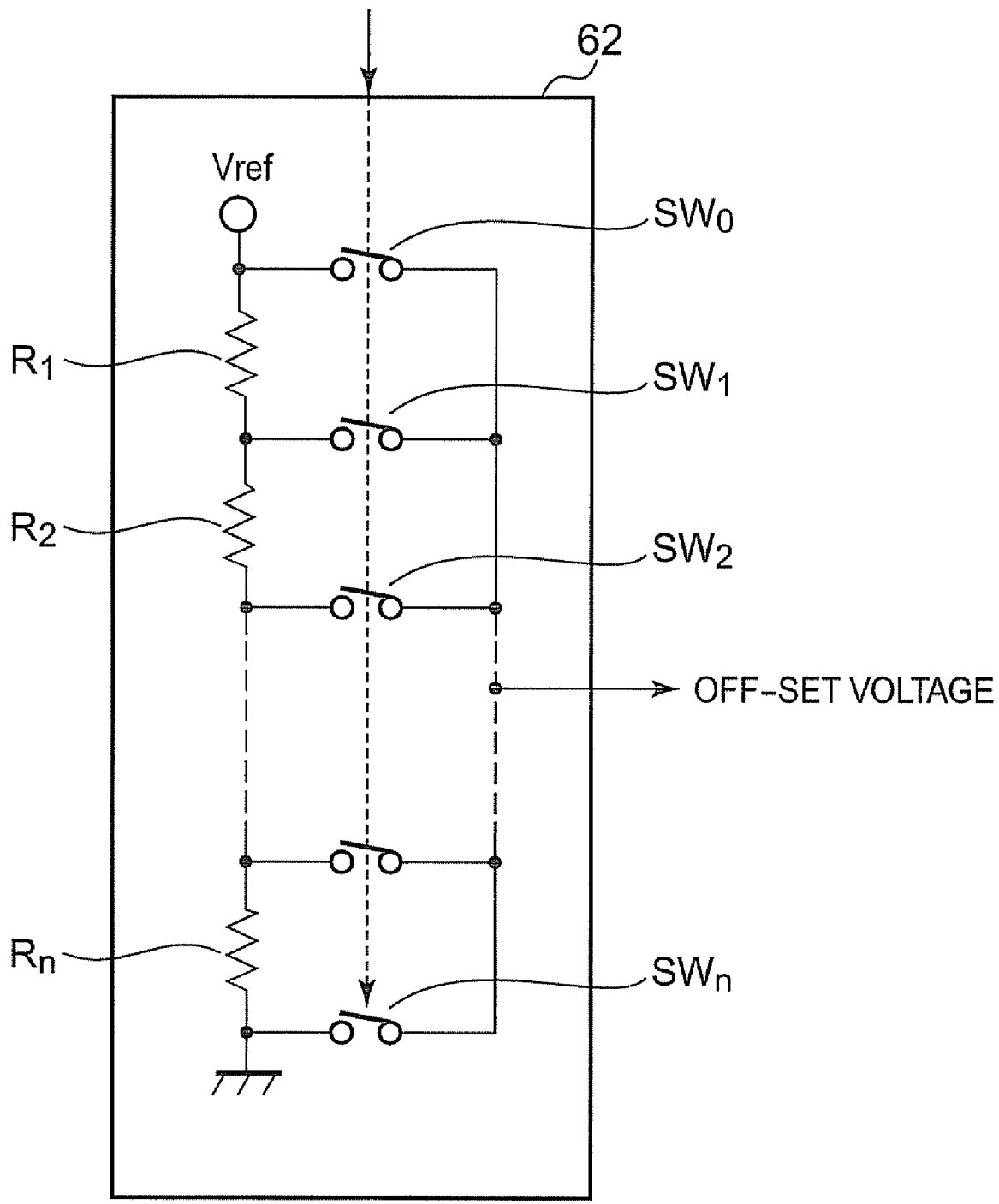
FIG. 7 is a circuitry diagram showing an example of an offset voltage generating unit.

FIG. 7 is a circuitry diagram showing an example of the offset voltage generating unit 62. The offset voltage generating unit 62 is a resistance voltage dividing circuit. The offset voltage generating unit 62 selects one of the voltages divided by resistances $R_1$ to $R_n$ using switches $SW_0$ to $SW_n$. The selected voltage is outputted as an offset voltage. The selection of the switches $SW_0$ to $SW_n$ is decided by the output of the offset voltage setup unit 61.

The sensitivity adjustment unit 70 is constituted by the variable resistors Ri and Rf connected with the amplification circuit 21a and an amplification adjustment unit 71. The amplification adjustment unit 71 sets up the resistances of the variable resistors Ri and Rf according to an instruction from the CPU 100.

Figure 8A:
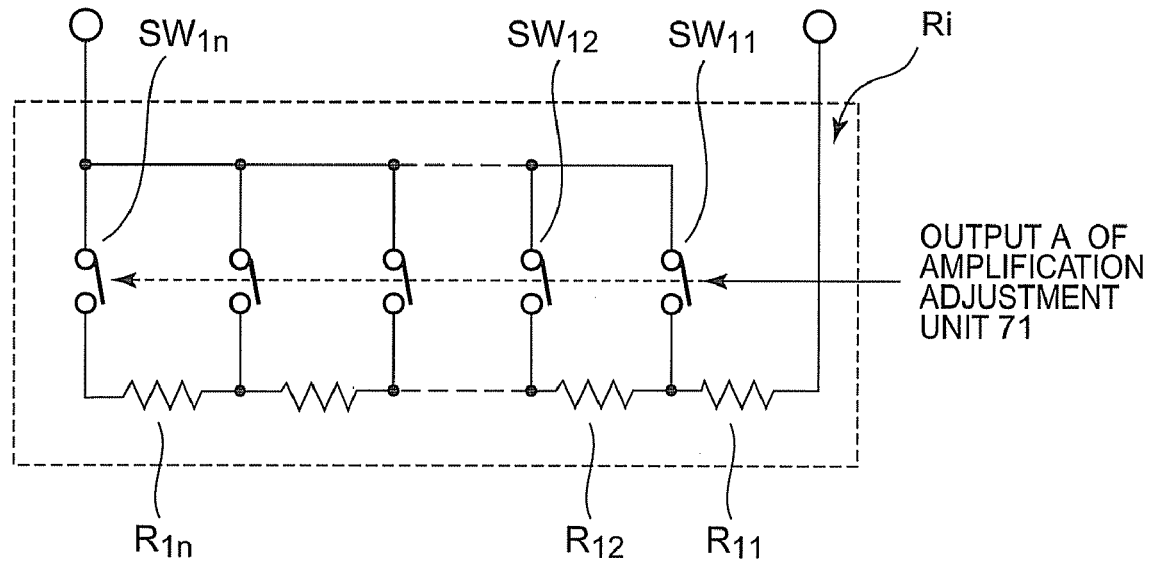
FIGS. 8A and 8B are circuitry diagrams showing examples of variable resistors employed in a sensitivity adjustment unit.
Figure 8B:
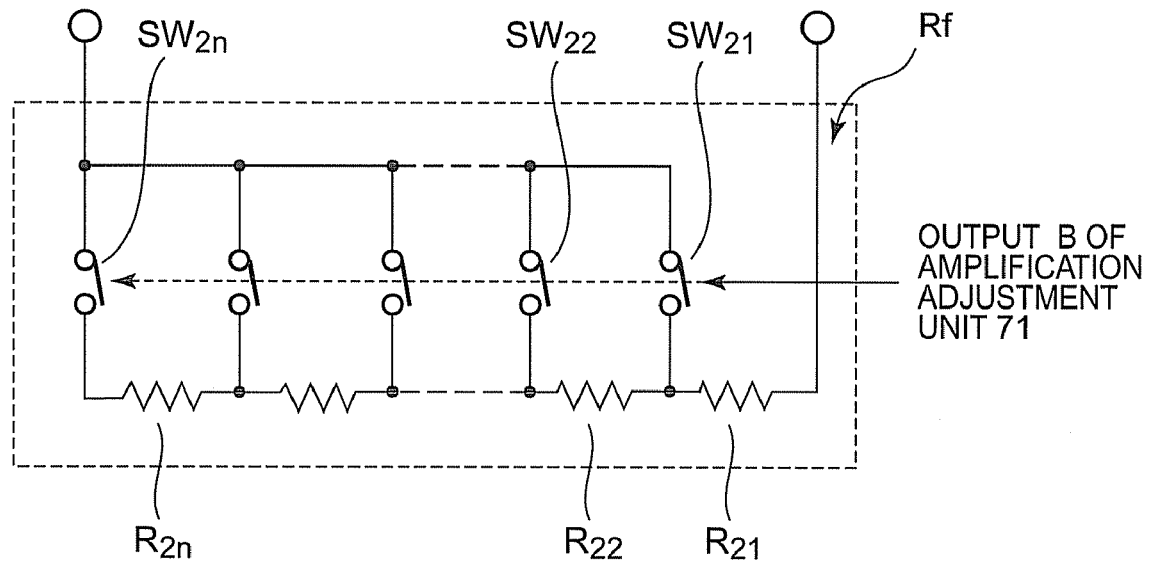

FIGS. 8A and 8B are circuitry diagrams showing examples of the variable resistors Ri and Rf respectively.

The variable resistor Ri of FIGS. 8A is a resistance circuit with taps which is provided with a plurality of resistors $R_{11}$ to $R_{1n}$ and a plurality of taps $SW_{11}$ to $SW_{1N}$. The taps $SW_{11}$ to $SW_{1n}$ are connected with connecting points of the resistors $R_{11}$ to $R_{1n}$ respectively. The resistance value of the variable resistors Ri is changed by selecting the taps $SW_{11}$ to $SW_{1n}$ according to an output A of the amplification adjustment unit 71.

The variable resistor Rf of FIGS. 8B is a resistance circuit with taps which is provided with a plurality of resistors $R_{21}$ to $R_{2n}$ and a plurality of taps $SW_{21}$ to $SW_{2n}$. The taps $SW_{21}$ to $SW_{2n}$ are connected with connection points of the resistors $R_{21}$ to $R_{2n}$ respectively. The resistance value of the variable resistor Rf is changed by selecting the taps $SW_{11}$ to $SW_{1n}$ according to an output B of the amplification adjustment unit 71.

The adjustment processing section of the CPU 100 adjusts the variations of the offset and the sensitivity of the sensor circuit 1 by controlling the offset adjustment unit 60 and the sensitivity adjustment unit 70. The adjustment processing by the CPU 100 is performed based on an adjustment program stored in the program memory 200.

Figure 9:
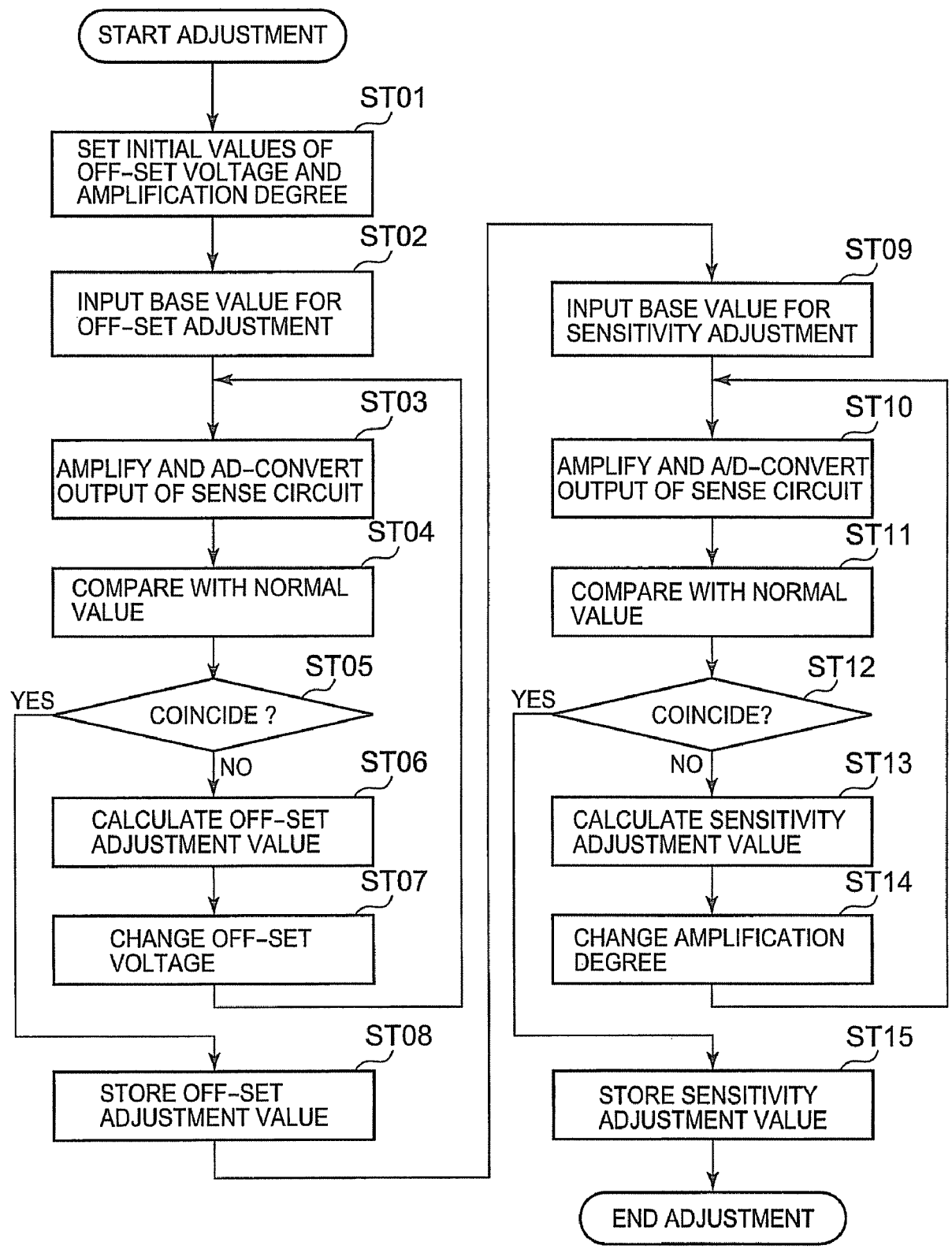
FIG. 9 is a flow chart showing an example of program of an adjustment process in the sensor apparatus of the second embodiment.

FIG. 9 is a flow chart showing an example of an adjustment process in the sensor apparatus shown in FIG. 6.

In FIG. 9, when adjustment processing is started, an initial value setup unit 30 of the CPU 100 sends an initial value to the offset voltage setup unit 61 and the amplification adjustment unit 71. The initial value setup unit 30 of the CPU 100 sets up an offset voltage and an amplification degree in the amplification circuit 21a in order to make the amplification circuit 21a operate in a ordinary state (step ST01).

In the state, a physical quantity of a base value is inputted into the sensor circuit 1 for offset adjustment (step ST02). The base value for the offset adjustment is predetermined. The physical quantity of the base value is converted to voltage by the sense circuit 1. The voltage obtained by the conversion is amplified with the amplification circuit 21a and is converted to digital data by the A/D converter 22 (step ST03).

Subsequently, the CPU 100 reads a normal value of A/D conversion output which is described in the adjustment program stored in the program memory 200. The normal value corresponds to the physical quantity of the base value for offset control.

In a comparison unit 31, the value of the digital data outputted from the A/D converter 22 is compared with the normal value read from the adjustment program (step ST04). The comparison unit 31 judges whether both of the values coincide with each other or not (step ST05).

Here, the normal value described in the adjustment program is a value which is set up for each of product types of a sensor element provided in the sense circuit 1.

When "no coincidence (N)" is judged between the digital data outputted from the A/D converter 22 and the normal value read from the adjustment program as a result of the judgment by comparison unit 31, an adjustment value calculation unit 32 of the CPU 100 calculates an offset adjustment value so that the error may be zero (step ST06). The adjustment value calculating unit 32 changes the setup value of the offset voltage set unit 61 so as to change the offset voltage outputted from the offset voltage generating unit 62 (step ST07).

After the change of the offset voltage by offset voltage setup unit 61, the flow returns to step ST03, and the processing of the steps described above are repeated again until the digital data outputted from the A/D converter 22 and the normal value read from the adjustment program coincide with each other.

In step ST05, when "coincidence (Y)" is indicated between the digital data outputted from the A/D converter 22 and the normal value read from the adjustment program, the CPU 100 stores the offset adjustment value calculated by the adjustment value calculation unit 32 in the offset adjustment value storage unit 8 (step ST08). After the end of the adjustment processing, the offset adjustment value stored in the offset adjustment value storage unit 8 is read and inputted to the offset adjustment unit 60 so that the offset voltage of the amplifier 21a is set.

Further, the flow goes to an adjustment processing for the variation of sensitivity of the sensor circuit 1. A physical quantity of another base value is inputted into the sensor circuit 1 for sensitivity adjustment (step ST09). The base value for the sensitivity adjustment is different from that for the offset adjustment described above.

The physical quantity of the base value for the sensitivity adjustment is converted to voltage by the sense circuit 1. The voltage obtained by the conversion is amplified by the amplification circuit 21a and is converted to digital data by the A/D converter 22 (step ST10).

Subsequently, the CPU 100 reads a normal value of A/D conversion output which is described in the adjustment program stored in the program memory 200. The above normal value corresponds to the physical quantity of the base value for sensitivity adjustment.

In the comparison unit 31, the value of the digital data outputted from the A/D converter 22 is compared with the normal value read from the adjustment program (step ST11). The comparison unit 31 judges whether both of the values coincide with each other or not (step ST12).

Here, the normal value described in the adjustment program is a value which is set up for each of product types of a sensor element arranged in the sense circuit 1.

When "no coincidence (N)" is judged between the digital data outputted from the A/D converter 22 and the normal value read from the adjustment program, as a result of the judgment by comparison unit 31, an adjustment value calculation unit 32 of the CPU 100 calculates a sensitivity adjustment value so that the error may be zero (step ST13). The adjustment value calculating unit 32 changes the setup value of the amplification adjustment unit 71 so as to change the resistances of the variable resistor Ri and Rf so that the amplification degree of the amplification circuit 21a changes (step ST14).

After the change of the amplification degree, the flow returns to step ST10, and the processing of the steps described above are repeated again until the digital data outputted from the A/D converter 22 and the normal value read from the adjustment program coincide with each other.

In step ST12, when "coincidence (Y)" is indicated between the digital data outputted from the A/D converter 22 and the normal value read from the adjustment program, the CPU 100 stores the sensitivity adjustment value in the sensitivity adjustment value storage unit 9 (step ST15). After ending of the adjustment processing, the sensitivity adjustment value stored in the sensitivity adjustment value storage unit 8 is read and inputted to the sensitivity adjustment unit 70 so that the amplification of the amplifier 21a is set.

When the storing of a sensitivity adjustment value is completed, the adjustment processing of the embodiment is ended.

Figure 10:
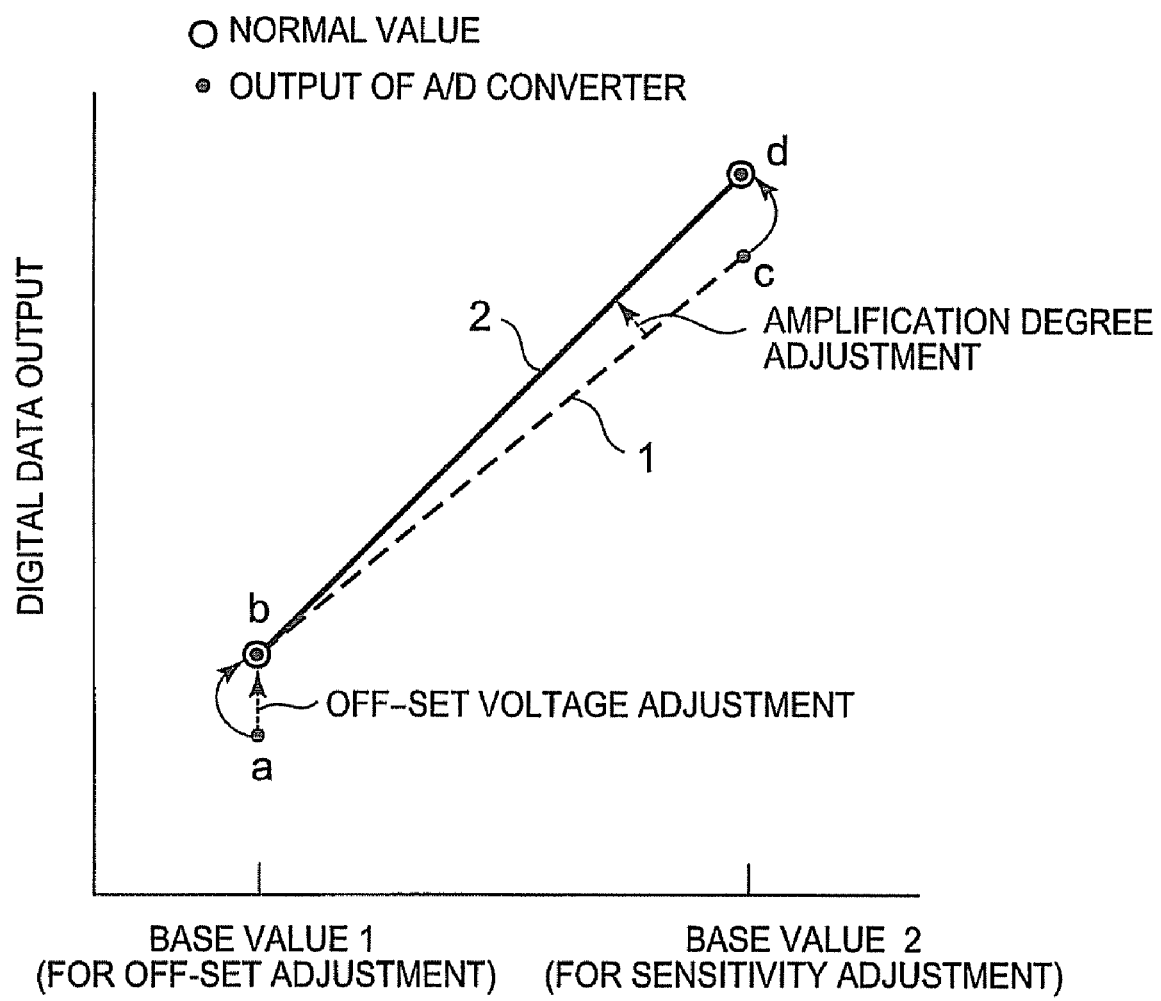
FIG. 10 shows a graph indicating an adjustment process in the sensor apparatus of the second embodiment.

FIG. 10 shows a graph indicating the output value of the digital data of A/D converter 22 versus the physical quantity inputted into the sensor circuit 1. Line 1 shows an amplification characteristic before adjustment, and line 2 shows an amplification characteristic after adjustment. "○" shows a normal value described in the adjustment program. and "." shows the output of the A/D converter 21a.

A digital data a is outputted from the A/D converter 22 by inputting a physical quantity of a base value for offset adjustment. Here, as a result of adjusting the offset voltage of the amplification circuit 21a, a digital data b, which is in coincidence with the normal offset value described in the adjustment program, is outputted.

Then, a physical quantity of the base value for sensitivity adjustment is inputted. As a result, a digital data c is outputted from the A/D converter 22. A digital data d, which is in coincidence with the normal amplification value described in the adjustment program, is outputted by adjusting the amplification of the amplification circuit 21a.

In this way, the variations of the offset and the sensitivity of the sensor circuit 1 are adjusted, and digital data, which is in coincidence with the normal specification of the sensor circuit 1, is outputted.

By performing the adjustment processing flow shown in FIG. 9, adjustment of the offset voltage and the amplification degree of the amplification circuit 21a is carried out corresponding to the variation of the offset and the sensitivity at the execution time of adjustment processing of the sensor circuit 1.

The sensor apparatus of the embodiment is capable of switching the power supply unit 7 on whenever detection of physical quantity is needed. Further, the sensor apparatus is capable of switching the power supply unit 7 off after the sensor apparatus is used for a period. Thus, the above adjustment processing may be performed every time electric power is supplied.

Figure 11:
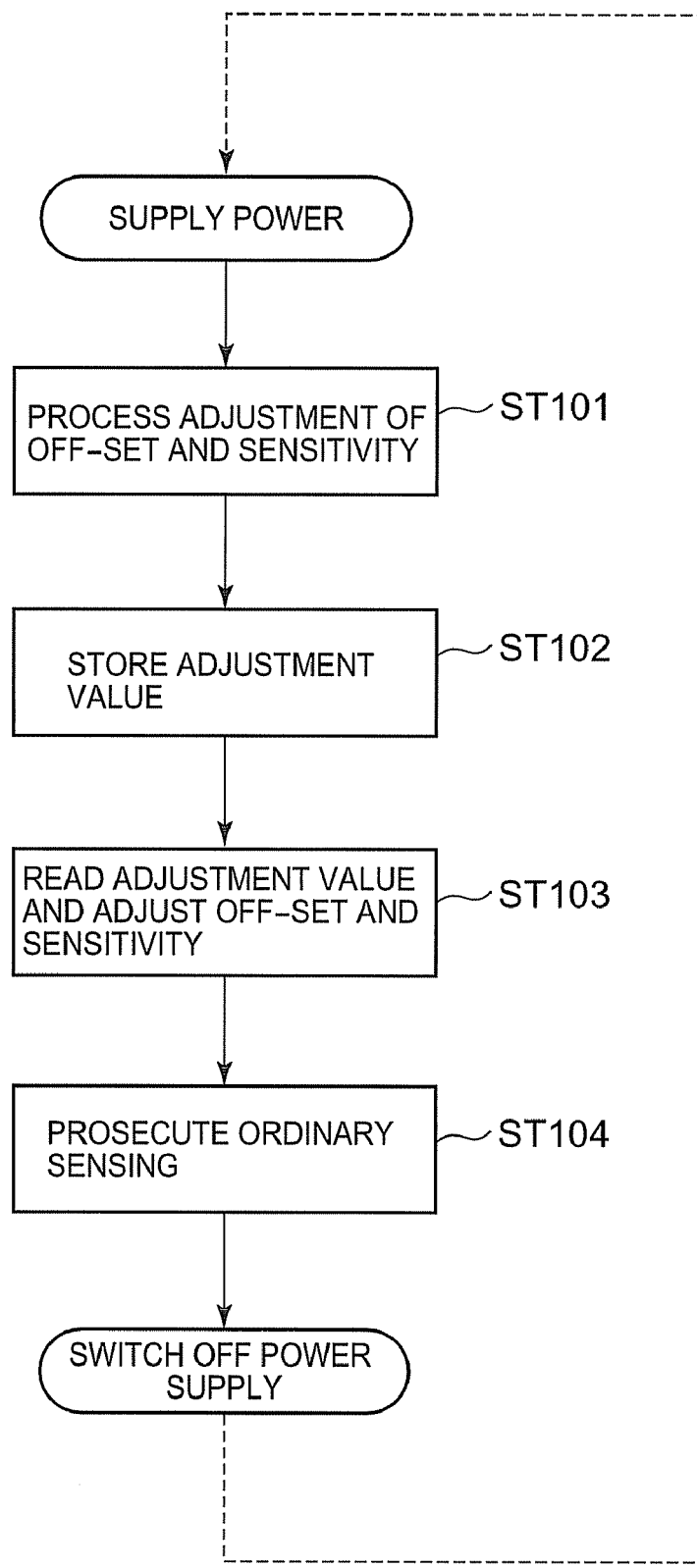
FIG. 11 is a flow chart showing an adjustment process in the sensor apparatus of the second embodiment.

FIG. 11 shows an example of flow for performing adjustment processing every time an electric power is supplied.

In the flow shown in FIG. 11, when the power supply unit 7 is switched on, the adjustment processing flow shown in FIG. 9 is performed immediately, and the variations of the offset and the sensitivity of the sensor circuit 1 adjusted (step ST101).

As a result of the adjustment, an offset adjustment value is stored in the offset adjustment value storage unit 8, and a sensitivity adjustment value is stored in the sensitivity adjustment value storage unit 9 (step ST102).

After the adjustment processing is completed, an ordinary processing is performed to detect physical quantity. The offset adjustment value stored in the offset adjustment value storage unit 8 and the sensitivity adjustment value stored in the sensitivity adjustment value are read respectively at this time. Adjustment of the offset voltage and the amplification of the amplification circuit 21a is performed (step ST103), and an ordinary processing is performed to detect physical quantity (step ST104).

The power supply unit 7 is disconnected after ending of the ordinary processing of the physical quantity detection.

By performing such processing, the offset voltage and the amplification of the amplification circuit 21a is adjusted in response to the variation of the offset voltage and the sensitivity of the sensor circuit 1 at the time of starting power supply. Even if characteristic change of the offset voltage and the sensitivity occurs in the sensor circuit 1 depending on temperature change, the adjustment is performed to compensate the characteristic change.

Similarly, even if characteristic change of the offset voltage and the sensitivity occurs in the sensor circuit 1 by aging, the adjustment is performed to compensate the characteristic change.

According to the embodiment, variation of offset and sensitivity of a sensor circuit may be adjusted by describing normal values of A/D conversion in an adjustment program which corresponds to base values of physical quantity for offset and sensitivity.

Thus, it is not necessary to prepare a fixed adjustment value for each sensor so that reduction of data amount may be attained.

Variation of offset and sensitivity of a sensor circuit may be adjusted corresponding to temperature characteristics at the time of starting power supply by performing adjustment processing every time of power supply starting, without using a temperature sensor.

Similarly, change of offset and sensitivity of a sensor circuit by aging may be compensated by performing the adjustment processing every time power supply starts.

Figure 12:
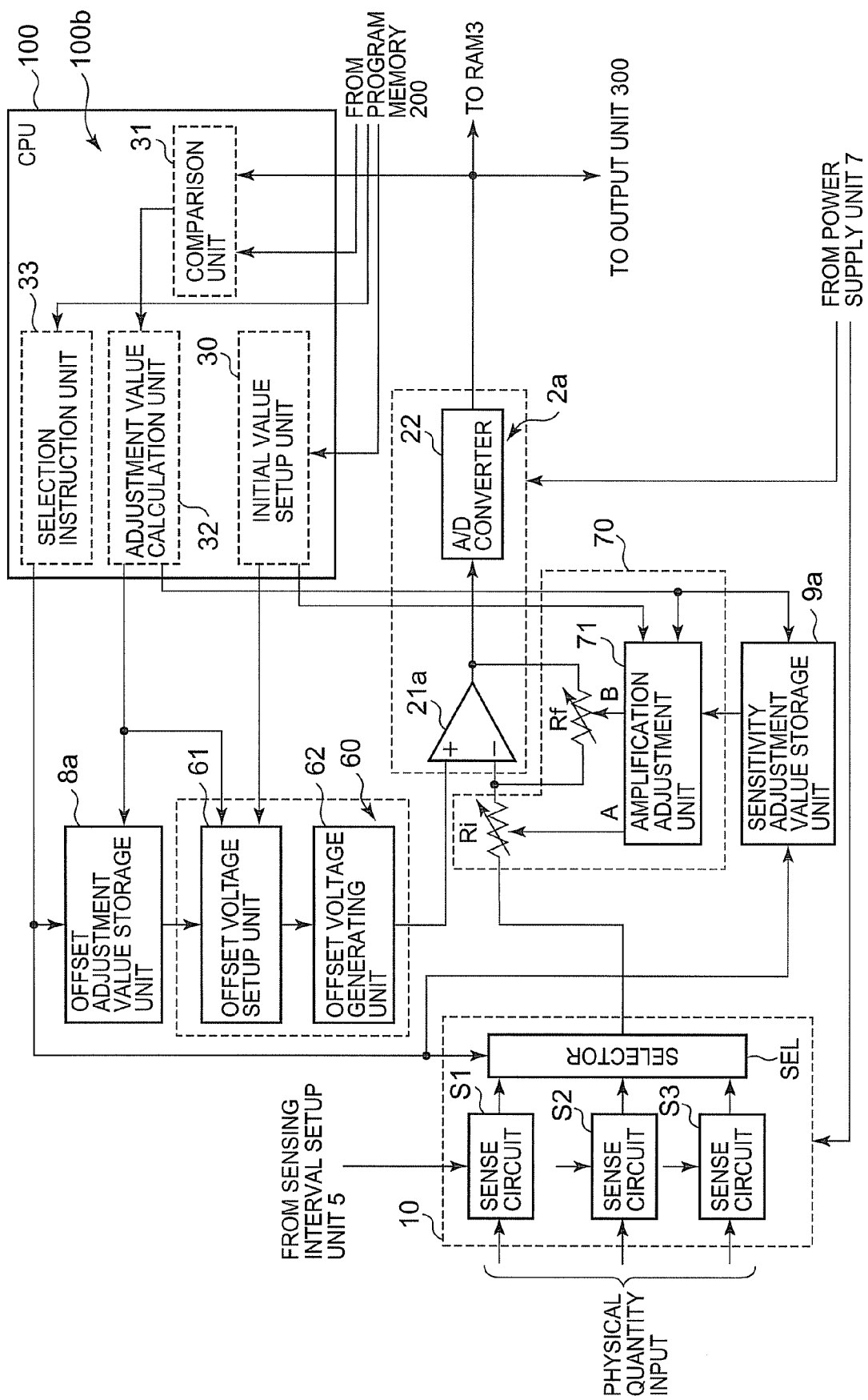
FIG. 12 is a block diagram showing a configuration of a sensor apparatus according to a third embodiment of the invention.

FIG. 12 is a block diagram showing a configuration of a sensor apparatus according to a third embodiment of the invention. The embodiment shows an example of a sensor apparatus which is provided with a plurality of sense circuits, such as a multiaxial sensor.

The fundamental structure of the sensor apparatus of the embodiment is the same as that of the sensor apparatus of the second embodiment shown in FIG. 6. In FIG. 12, the blocks having the same functions as those of FIG. 6 are given the same numerals as FIG. 6.

In the embodiment, a sensor unit 1a is provided with three sense circuits S1 to S3 and a selector SEL. A selection instruction unit 33 is provided in the adjustment processing section 100b of the CPU 100. A selection instruction data is given to the selection instruction unit 33 from the program memory 200. The selector SEL selects and outputs one of the outputs of the three sense circuits S1 to S3 according to a sense circuit selection signal outputted from the selection instruction unit 33.

In the embodiment, the sense circuits S1 to S3 are selected one after another by the sense circuit selection signal. Thus, adjustment processing is performed one after another for the sense circuits S1 to S3 respectively by the initial value setup unit 30, the comparison unit 31 and the adjustment value calculating unit 32 in the adjustment processing section 100b of the CPU 100. As a result, offset and sensitivity can be adjusted individually for the sense circuits S1 to S3.

An offset adjustment value storage unit 8a is provided to store an offset adjustment value for each of the sense circuits which is calculated by the adjustment processing. A sensitivity adjustment value storage unit 9a is provided to store a sensitivity adjustment value for each of the sense circuits, which is calculated by the adjustment processing.

The adjustment values of the selected sense circuit are read from the offset adjustment value storage unit 8a and the sensitivity adjustment value storage unit 9a, in response to the selection of the sense circuits Si to S3 by the sense circuit selection signal.

Figure 13:
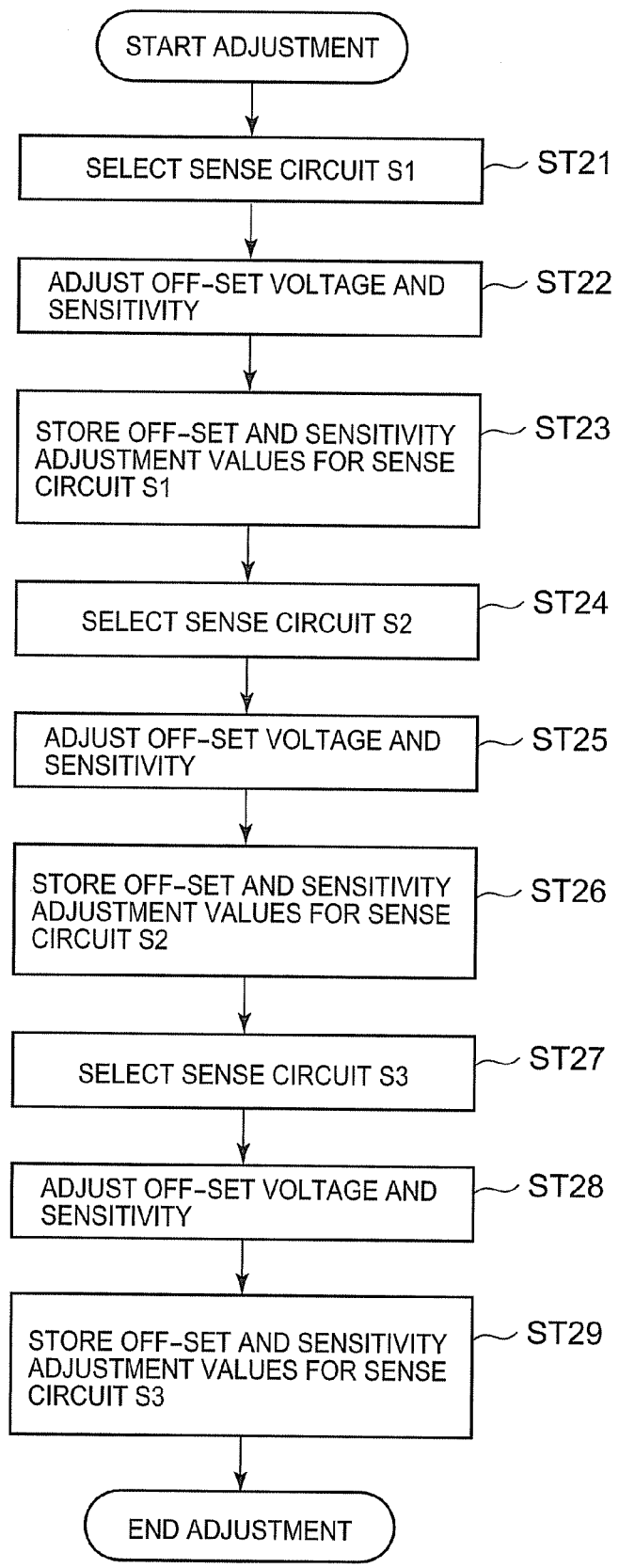
FIG. 13 is a flow chart showing an example of program of an adjustment process in the sensor apparatus of the third embodiment.

FIG. 13 shows an example of flow of the adjustment processing in the third embodiment.

By starting adjustment processing, the CPU 100 select the sense circuit S1 by the sense circuit selection signal from the selection instruction unit 33 (step ST21).

By the flow shown in FIG. 9, adjustment of offset voltage and amplification of the amplification circuit 21a is applied to the selected sense circuit S1 (step ST22).

The offset adjustment value and the sensitivity adjustment value, which is calculated as a result of the adjustment processing, are stored in the offset adjustment value storage unit 8a and the sensitivity adjustment value storage unit 9a respectively for the sense circuit S1 (step ST23).

Further, the CPU 100 selects the sense circuit S2 by the sense circuit selection signal from the selection instruction unit 33 (step ST24).

By the flow shown in FIG. 9, adjustment of the offset voltage and the amplification of the amplification circuit 21a and sensitivity is performed to for the sense circuit S2 as that of the sense circuit S1 (step ST25).

The offset adjustment value and the sensitivity adjustment value, calculated are stored in the offset adjustment value storage unit 8a and the sensitivity adjustment value storage unit 9a respectively for the sense circuit S2. (step ST26).

Finally, CPU100 selects the sense circuit S3 by the sense circuit selection signal received from selection instructions unit 33 (step ST27). By the flow shown in FIG. 9, adjustment of the offset voltage and amplification of the amplification circuit 21a is performed as the sense circuit S1 (step ST28). The offset adjustment value and the sensitivity adjustment value calculated are stored in the offset adjustment value storage unit 8a and the sensitivity adjustment value storage unit 9a respectively for the sense circuit S3, and the adjustment processing is ended (step ST29).

In the embodiment, optimal adjustment may be performed for each of the sense circuits, since the respective offset adjustment values and the respective sensitivity adjustment values are calculated for the sense circuits.

In the above embodiments, digital data are written in the RAM. In place of the RAM, other data memory such as a EEPROM (Electrically Erasable PROM) may be used to write digital data.

Other-embodiments-or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A sensor apparatus comprising:
    a sense circuit to convert inputted physical quantity to electrical signal,
    an analog signal processing unit having an amplification circuit and an A/D converter, the amplification circuit amplifying an analog signal outputted from the sense circuit, and the A/D converter converting the output signal of the amplifier to digital data,
    a sensing interval setup unit to set a sensing interval for the sense circuit,
    a power supply unit to supply electric power to the sense circuit and the analog signal processing unit,
    a power supply control unit to control the power supply unit,
    a storage unit to store the digital data outputted from the A/D converter every sensing interval of the sensing interval,
    a data value change judgment unit to change the setup of the sensing interval by the sensing interval setup unit, the data value change judgment unit changing the control mode of the power supply control unit in response to judgment of value change between a plural number of digital data designated from the digital data being stored in the storage unit,
    an offset adjustment unit to adjust the offset voltage of the amplification circuit,
    a sensitivity adjustment unit to adjust the amplification degree of the amplification circuit,
    a program memory to store an adjustment program to adjust the offset voltage and the sensitivity of the amplification circuit, and
    an adjustment processing unit to control the offset adjustment unit and the sensitivity adjustment unit based on the adjustment program stored in the program memory.

2. A sensor apparatus according to claim 1, further comprising an initial value setup unit, wherein the initial values of the offset adjustment unit and the sensitivity adjustment unit are set by the initial value setup unit.

3. A sensor apparatus according to claim 2, wherein the initial values are described in the adjustment program stored in the program memory.

4. A sensor apparatus according to claim 1, further comprising a comparison unit and an adjustment value calculation unit, wherein normal values of the output of the A/D converter are described to correspond to base values of physical quantity, the values outputted from the A/D converter and the normal values are compared by the comparison unit when the base values are inputted to the sense circuit, and adjustment values are calculated by the adjustment value calculation unit to adjust the offset adjustment unit and the sensitivity adjustment unit based on the output of the comparison unit.

5. A sensor apparatus according to claim 4, further comprising adjustment value storage unit units, wherein the calculated adjustment values are stored in the adjustment value storage unit units respectively, the adjustment values stored in the adjustment value storage unit units are transmitted to the offset adjustment unit and the sensitivity adjustment unit so that the offset voltage and the amplification degree of the amplification circuit are set.

6. A sensor apparatus comprising:
    sense circuits to convert inputted physical quantities to electrical signal,
    a selector to select analog signals being outputted from the sense circuits,
    an analog signal processing unit having an amplification circuit and an A/D converter, the amplification circuit amplifying an analog signal outputted from each of the sense circuits selected by the selector, and the A/D converter converting the output signal of the amplification circuit to digital data,
    a sensing interval setup unit to set a sensing interval for the sense circuits,
    a power supply unit to supply electric power to the sense circuits and the analog signal processing unit,
    a power supply control unit to control the power supply unit,
    a storage unit to store the digital data outputted from the A/D converter every sensing interval of the sensing interval,
    a data value change judgment unit to change the setup of the sensing interval by the sensing interval setup unit, the data value change judgment unit changing the control mode of the power supply control unit in response to judgment of value change between a plural number of digital data designated from the digital data being stored in the storage unit,
    an offset adjustment unit to adjust the offset voltage of the amplification circuit
    a sensitivity adjustment unit to adjust the amplification degree of the amplification circuit, a program memory to store an adjustment program to adjust the offset voltage and the sensitivity of the amplification circuit, and an adjustment processing unit to process adjusting set voltage and sensitivity of the amplification circuit for each of the sense circuits based on the adjustment program stored in the program memory.

7. A sensor apparatus according to claim 6, further comprising an initial value setup unit, wherein the initial values of the offset adjustment unit and the sensitivity adjustment unit are set by the initial value setup unit.

8. A sensor apparatus according to claim 7, wherein the initial values are described in the adjustment program stored in the program memory.

9. A sensor apparatus according to claim 6, further comprising a comparison unit and an adjustment value calculation unit, wherein normal values of the output of the A/D converter are described to correspond to base values of physical quantity, the values outputted from the A/D converter and normal values are compared by the comparison unit when the base values are inputted to each of the sense circuits, and adjustment values are calculated by the adjustment value calculation unit to adjust the offset adjustment unit and the sensitivity adjustment unit for each of the sense circuits based on the output of the comparison unit.

10. A sensor apparatus according to claim 9, further comprising adjustment value storage unit units, wherein the calculated adjustment values are stored in the adjustment value storage unit units respectively, the adjustment values stored in the adjustment value storage unit units are transmitted to the offset adjustment unit and the sensitivity adjustment unit so that the offset voltage and the amplification degree of the amplification circuit are set for each of the sense circuits.

* * * * *